United States Patent [19]
Ohshima et al.

[11] Patent Number: 5,245,396
[45] Date of Patent: Sep. 14, 1993

[54] COLOR IMAGE FORMING APPARATUS FOR USE WITH A RECORDING MEDIUM HAVING A LATERALLY EXTENDING REGISTRATION MARK

[75] Inventors: Kiyoshi Ohshima; Yoshiyumi Tamiya, both of Yokohama; Kenichi Shimizu; Tadahiro Suzuki, both of Kawasaki; Kazuaki Iizuka, Tokyo, all of Japan

[73] Assignee: Ricoh Company, Ltd., Tokyo, Japan

[21] Appl. No.: 846,942

[22] Filed: Mar. 6, 1992

[30] Foreign Application Priority Data

Mar. 7, 1991 [JP] Japan .................................. 3-041592

[51] Int. Cl.⁵ .............................................. G03G 21/00
[52] U.S. Cl. .................................... 355/317; 101/193; 346/157; 355/326
[58] Field of Search ............... 355/203, 208, 310, 317, 355/326, 327; 118/645; 346/157; 83/371; 101/193, 196; 400/120 MP

[56] References Cited

U.S. PATENT DOCUMENTS

| | | | |
|---|---|---|---|
| 4,569,584 | 2/1986 | St. John et al. | 346/157 X |
| 4,721,969 | 1/1988 | Asano | 346/157 |
| 4,829,326 | 5/1989 | Emmett et al. | 346/157 |
| 4,965,597 | 10/1990 | Ohigashi et al. | 346/157 |
| 4,984,029 | 1/1991 | Nishikawa | 355/310 |
| 5,025,269 | 6/1991 | Saeki et al. | 346/157 X |
| 5,063,398 | 11/1991 | Murai et al. | 346/157 |

FOREIGN PATENT DOCUMENTS

| | | | |
|---|---|---|---|
| 0217267 | 9/1986 | Japan | 400/120 MP |
| 0249778 | 11/1986 | Japan | 400/120 MP |

*Primary Examiner*—A. T. Grimley
*Assistant Examiner*—William J. Royer
*Attorney, Agent, or Firm*—Oblon, Spivak, McClelland, Maier & Neustadt

[57] ABSTRACT

A color image forming apparatus of the type recording a register mark on a recording medium for registering the leading edges of images of respective colors to form a color image. The apparatus forms the register mark on the medium outside of the effective area of a main image and such that the mark extends perpendicular to an intended direction of medium feed. The register mark is developed in cyan and in the highest density to insure accurate register of colors. The register mark is cut off together with the leading edge of the medium.

5 Claims, 2 Drawing Sheets

COLOR IMAGE FORMING APPARATUS FOR USE WITH A RECORDING MEDIUM HAVING A LATERALLY EXTENDING REGISTRATION MARK

BACKGROUND OF THE INVENTION

The present invention relates to a copier, printer, facsimile transceiver or similar color image forming apparatus of the type recording a register mark or marks on a recording medium for registering the leading edges of images of respective colors to form a color image. More particularly, the present invention is concerned with such a type of image forming apparatus which does not need an exclusive cutter on cutting part of the recording medium carrying the register marks after image formation.

Generally, a color image forming apparatus of the type described includes a roll of recording medium, a writing device for electrostatically forming a latent image on the medium, a developing device having a yellow, a magenta, a cyan and a black developing unit, and a register mark sensor for sensing register marks recorded in black on the medium. It is a common practice with this type of apparatus to locate the register marks on the medium outside of an effective image area and adjacent to one side edge with respect to an intended direction of medium feed. The leading edges of images of respective colors are brought into register on the basis of the output of the register mark sensor. After the image formation, the register marks are not necessary and, therefore, cut off by a cutter.

A problem with the conventional apparatus described above is that a box or similar receptacle has to be disposed in or outside of the apparatus body in order to collect the register marks recorded along the side edge of the recording medium and cut off after image formation. Another problem is that not only a main cutter for cutting the medium in a predetermined size but also an extra cutter for cutting off the register mark portions are needed, resulting in a bulky and expensive construction.

SUMMARY OF THE INVENTION

It is, therefore, an object of the present invention to provide a color image forming apparatus which eliminates the need for an exclusive cutter otherwise assigned to register marks and insures accurate register of colors.

A color image forming apparatus for forming a color image by registering the leading edges of images of respective colors on the basis of a register mark of the present invention comprises a writing device for electrostatically forming a latent image on a recording medium, a developing device comprising a yellow, a magenta and a cyan developing unit for developing respective latent images electrostatically formed on the recording medium by the writing device, and a sensor for sensing the register mark recorded on the recording medium. The register mark is located on the recording medium outside of an effective image area and extends in a direction perpendicular to a direction for transporting the recording medium.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 2:
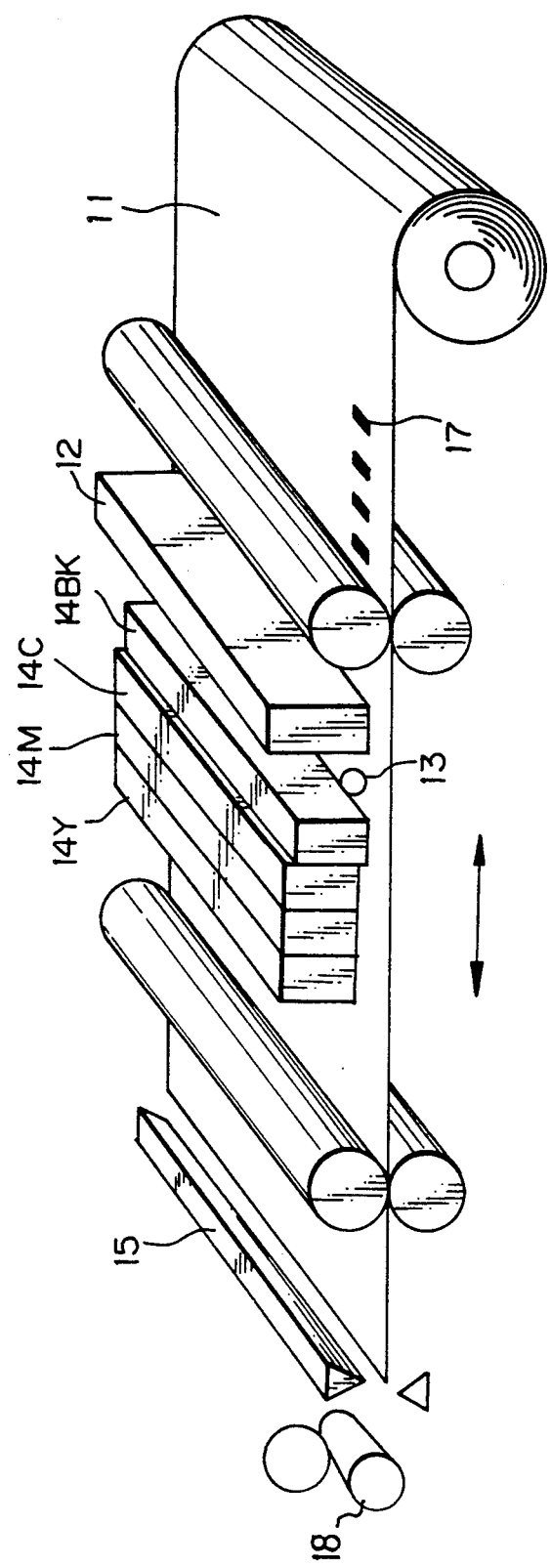
FIG. 2 is a perspective view of a conventional color image forming apparatus.

To better understand the present invention, a brief reference will be made to a conventional color image forming apparatus, shown in FIG. 2. As shown, the apparatus has a roll of recording medium 11, a writing device 12 for electrostatically forming a latent image on the recording medium 11, a developing device made up of a yellow, a magenta, a cyan and a black developing unit 14Y, 14M, 14C and 14BK, and a register mark sensor 13 for sensing register marks 17 recorded on black in the medium 11. The register marks 17 are positioned outside of an effective image area of the medium 11 and adjacent to one side edge of the medium 11 with respect to an intended direction of medium feed. The leading edges of images of different colors are brought into register in response to the outputs of the register mark sensor 13 representative of the register marks 17. After image formation, a cutter 18 cuts off the portion of the medium 11 carrying the register marks 17 because the register marks 17 are not necessary. A problem with this type of apparatus is that a box or similar receptacle for collecting the cut portions of the medium 11 has to be provided in or outside of the apparatus. Moreover, not only a main cutter 15 for cutting the medium 11 in a predetermined size but also the cutter 18 are indispensable, resulting in a bulky and expensive construction.

Figure 1:
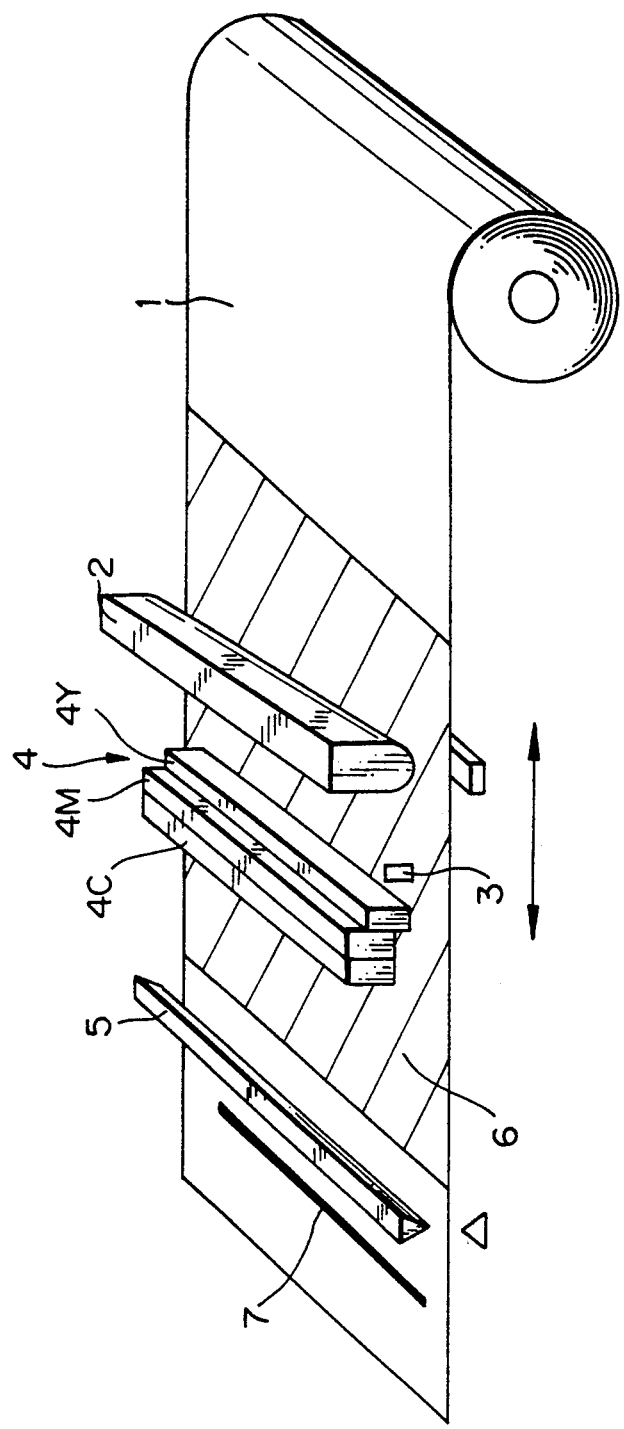
FIG. 1 is a perspective view of a color image forming apparatus embodying the present invention.

Referring to FIG. 1, a color image forming apparatus embodying the present invention is shown and includes a recording medium in the form of a paper roll 1. A transport roller, not shown, feeds the paper 1 from the right to the left, as viewed in the figure. A record head, or writing device 2, a register mark sensor, or register mark sensing means, 3, a developing device 4, and a cutter 5 are arranged one after another in the intended direction of paper transport. The developing device 4 is made up of developing units 4Y, 4M and 4C storing yellow, magenta and cyan developing liquid, respectively. The developing units 4Y-4C are each movable up and down independently of the others.

In operation, while the paper 1 is transported to the left as viewed in FIG. 1, the record head 2 electrostatically forms a latent image of a register mark 7 on the paper 1 in a direction perpendicular to the intended direction of paper feed and in a position preceding the effective area where a main image 6 is formed. The developing device 4 develops the latent image. When the developing device 4 includes a black developing unit, it will develop the latent image in black. In the illustrative embodiment having only the yellow, magenta and cyan developing units 4Y-4C, the latent image cannot be developed in black unless it is sequentially developed in the three colors, possibly resulting in misregister of the colors. The embodiment, therefore, develops the latent image of the register mark 7 in a single color. Assuming that the register sensor 3 is implemented by a photosensor, the register mark 7 will be successfully sensed if a blue light emitting element (LED), a green LED or a red LED is used for yellow, magenta, or cyan as a light emitting element and if the sensitivity of a light-sensitive element is matched to the light emitting element. However, the embodiment develops the latent image of the register mark 7 in cyan partly because the red LED is more efficient that the others and partly because the resulting register mark 7 is more stable and can be sensed more accurately than the others.

Further, the higher the density of the register mark 7, the higher the signal-to-noise (S/N) ratio is and, therefore, the more stably and accurately the register mark 7 can be sensed. In addition, assuming that the record head 2 is an ion flow head, the latent image potential on the paper 1 can be varied to control the dot density to any one of tone values 0–256. For these reasons, the illustrative embodiment records the register mark 7 in the highest density to promote stable and accurate detection of the register mark 7.

After the register mark 7 has been formed on the paper 1, the paper 1 is returned to the right until the register mark 7 moves away from the sensor 3. Subsequently, the paper 1 is again transported to the left. As soon as the sensor 3 senses the edge of the register mark 7, a latent image is formed on the paper 1 by yellow image data. After the developing unit 6Y has developed this latent image by a yellow developing liquid, the paper 1 is returned to the right until the register mark 7 moves away from the sensor 3. Such a procedure is repeated to form a magenta image and a cyan image in the same manner as the yellow image, thereby producing a color image. While the third image, i.e., cyan image is formed, the leading edge of the main image 6 formed on the paper 1 is cut along the effective area. At this instant, the register mark 7 is cut off together with the leading edge of the main image 6 because it is located outside of the effective area of the image 6 and extends perpendicular to the direction of paper transport. This eliminates the need for an exclusive cutter for the register mark 7. The trailing edge of the paper 1 is cut after the cyan image has been superposed on the other images to complete a color image.

In summary, it will be seen that the present invention provides a color image forming apparatus which forms a register mark on a recording medium outside of and ahead of an effective area of a main image and orients the register mark perpendicular to a direction for transporting the medium. The apparatus, therefore, cuts off the register mark together with the leading edge of the medium to thereby eliminate the need for an extra cutter otherwise assigned to the register mark. Because the register mark is recorded on the medium in high density, the edge of the mark can be sensed with accuracy high enough to insure the register of colors. In addition, a high sensitivity sensor is usable because the register mark is recorded in cyan, further promoting accuate register of colors.

Various modifications will become possible for those skilled in the art after receiving the teachings of the present disclosure without departing from the scope thereof.

What is claimed is:

1. A color image forming apparatus for forming a color image by registering the leading edges of images of respective colors on the basis of a single register mark, said apparatus comprising:
    writing means for electrostatically forming a latent image on a recording medium;
    developing means comprising a yellow, a magenta and a cyan developing unit for developing respective latent images electrostatically formed on said recording medium by said writing means; and
    means for sensing said register mark recorded on said recording medium;
    said register mark being located on said recording medium outside of an effective image area and extending in a direction perpendicular to a direction for transporting said recording medium,
    wherein the length of the register mark in said direction perpendicular to said transporting direction is greater than one-half the width of the recording medium in said direction perpendicular to said transporting direction, and wherein said writing means renders tones by modulating the density of a recording dot, said register mark being recorded on said recording medium in the highest density.

2. A color image forming apparatus for forming a color image by registering the leading edges of images of respective colors on the basis of a single register mark, said apparatus comprising:
    writing means for electrostatically forming a latent image on a recording medium;
    developing means comprising a yellow, a magenta, and a cyan developing unit for developing respective latent images electrostatically formed on said recording medium by said writing means; and
    means for sensing said register mark recorded on said recording medium;
    said register mark being located on said recording medium outside of an effective image area and extending in a direction perpendicular to a direction for transporting said recording medium,
    wherein the length of the register mark in said direction perpendicular to said transporting direction is greater than one-half the width of the recording medium in said direction perpendicular to said transporting direction, and wherein said register mark is developed by said cyan developing unit.

3. A color image forming apparatus for forming a color image by registering the leading edges of images of respective colors on the basis of a single register mark, said apparatus comprising:
    writing means for electrostatically forming a latent image on a recording medium;
    developing means comprising a yellow, a magenta and a cyan developing unit for developing respective latent images electrostatically formed on said recording medium by said writing means; and
    means for sensing said register mark recorded on said recording medium;
    said register mark being located on said recording medium outside of an effective image area and extending in a direction perpendicular to a direction for transporting said recording medium, said transporting direction being defined as the direction in which the recording medium is initially fed to the writing means from a remote location,
    wherein said sensing means is located downstream from said writing means in a transporting direction of the recording medium, and wherein said writing means begins forming said electrostatic latent image at the moment said sensing means senses the register mark recorded on said recording medium.

4. An apparatus as claimed in claim 3, wherein in said transporting direction, said writing means, sensing means and developing means are sequentially arranged such that the developing means is located downstream from said sensing means in the transporting direction.

5. An apparatus as claimed in claim 3, wherein after said register mark has been formed on the recording medium, the recording medium is moved in a direction opposite to said transporting direction until the register mark passes said sensing means, at which point the recording medium is stopped and then moved again in the transporting direction, such that at the moment when the sensing means senses the register mark, feeding of the recording medium in the transporting direction is stopped and the writing means begins forming said electrostatic latent image recorded on said recording medium;

said register mark being located on said recording medium outside of an effective image area and extending in a direction perpendicular to a direction for transporting said recording medium.

* * * * *